US012603419B2

(12) United States Patent
Varel et al.

(10) Patent No.: US 12,603,419 B2
(45) Date of Patent: Apr. 14, 2026

(54) DRIVING METHODS TO MINIMIZE THE EFFECT OF LEAKAGE CURRENT IN TUNABLE ELEMENTS

(71) Applicant: Kymeta Corporation, Redmond, WA (US)

(72) Inventors: Cagdas Varel, Seattle, WA (US); Ryan Stevenson, Seattle, WA (US); Steven Howard Linn, Hillsboro, OR (US); Tung Pham, Redmond, WA (US); Jeff Kissinger, Redmond, WA (US)

(73) Assignee: KYMETA CORPORATION, Redmond, WA (US)

( * ) Notice: Subject to any disclaimer, the term of this patent is extended or adjusted under 35 U.S.C. 154(b) by 632 days.

(21) Appl. No.: 17/889,160

(22) Filed: Aug. 16, 2022

(65) Prior Publication Data

US 2023/0057176 A1 Feb. 23, 2023

Related U.S. Application Data

(60) Provisional application No. 63/235,514, filed on Aug. 20, 2021.

(51) Int. Cl.
*H04M 1/00* (2006.01)
*H01Q 1/28* (2006.01)
(Continued)

(52) U.S. Cl.
CPC ............. *H01Q 1/288* (2013.01); *H01Q 5/314* (2015.01); *H01Q 9/0442* (2013.01)

(58) Field of Classification Search
CPC ...... H01Q 1/288; H01Q 5/314; H01Q 9/0442; H01Q 13/103; H01Q 15/0066; H01Q 21/064
(Continued)

(56) References Cited

U.S. PATENT DOCUMENTS 4,918,338 A * 4/1990 Wong ................. H03H 11/1291 330/109
5,854,593 A * 12/1998 Dykema ............ G07C 9/00182 340/13.21

(Continued)

FOREIGN PATENT DOCUMENTS

CN 102290095 A 12/2011
TW I409989 B 9/2013

OTHER PUBLICATIONS

International Preliminary Report on Patentability received for PCT Patent Application No. PCT/US2022/041098, mailed on Feb. 29, 2024, 8 pages.

(Continued)

*Primary Examiner* — Amancio Gonzalez
(74) *Attorney, Agent, or Firm* — Womble Bond Dickinson (US) LLP

(57) ABSTRACT

Antennas with tunable elements and methods for using the same are disclosed. In some embodiments, an antenna comprises: a plurality of radio-frequency (RF) radiating antenna elements, wherein each antenna element of the plurality of RF radiating antenna elements comprises a tunable element, circuitry connected to the tuning element to set a voltage on the tunable element. In some embodiments, the circuitry comprises a voltage storage structure, a first transistor having a first gate connected to the voltage storage structure, a first source connected to the tunable element, and a first drain for coupling to a constant voltage source, and a data voltage input terminal operable to apply a voltage to the voltage storage structure and to the first gate to determine current through the first transistor.

20 Claims, 9 Drawing Sheets

(51) Int. Cl.
*H01Q 5/314* (2015.01)
*H01Q 9/04* (2006.01)

(58) Field of Classification Search
USPC .......................................................... 455/450.1
See application file for complete search history.

(56) References Cited

U.S. PATENT DOCUMENTS 6,075,979 A * 6/2000 Holtvoeth ............... H03L 1/023 455/318
6,134,130 A * 10/2000 Connell .................. H02J 50/12 363/70
6,696,879 B1 * 2/2004 O'Toole ............. G06K 19/0716 327/356
6,836,468 B1 * 12/2004 O'Toole .................. H03L 7/148 342/51
6,885,345 B2 * 4/2005 Jackson ................... H01Q 3/40 343/876
6,903,656 B1 * 6/2005 Lee .................... G06K 7/10316 340/572.1
7,051,945 B2 * 5/2006 Empedocles .......... H10D 30/43 257/14
7,310,556 B2 * 12/2007 Bulkes ................. A61N 1/3787 607/9
7,499,681 B2 * 3/2009 Chang ...................... H04B 1/52 455/526
7,519,421 B2 * 4/2009 Denker ................ A61N 1/3787 607/33
7,649,496 B1 1/2010 Silver et al.
7,729,722 B2 * 6/2010 Rofougaran ........... H04B 17/14 455/260
7,868,764 B2 * 1/2011 Wall ................... G06K 19/0723 340/572.5
8,063,839 B2 * 11/2011 Ansari ..................... H01Q 9/27 343/745
8,258,861 B2 * 9/2012 Bhaumik ........... H03K 19/0016 327/544
8,269,683 B2 * 9/2012 McKinzie ............ H01Q 9/0407 343/745
8,362,968 B2 * 1/2013 Fukuda ................ H04B 7/0871 343/702
8,441,324 B2 * 5/2013 Li ........................ H03B 5/1243 331/117 R
8,508,379 B2 * 8/2013 Vander Veen .... H04M 1/72457 455/26.1
8,666,347 B2 * 3/2014 Wilkerson ............. H04B 1/109 455/278.1
8,681,753 B2 * 3/2014 Kokkinen ............. H04W 28/26 370/328
8,792,848 B2 * 7/2014 Rofougaran ......... H04B 1/0067 455/333
8,868,014 B2 * 10/2014 Krivokapic .......... H01Q 9/0442 455/193.1
8,948,706 B2 * 2/2015 Napoles .............. B81C 1/00976 455/73
9,020,456 B2 * 4/2015 Wentzloff ............ H04B 1/1615 455/313
9,165,171 B2 * 10/2015 Murdoch ........... G06K 7/10366
9,287,829 B2 * 3/2016 Nobbe .................... H03F 3/195
9,301,177 B2 * 3/2016 Ballantyne ........... H04B 17/318
9,318,257 B2 * 4/2016 Lou ..................... H02J 7/00034
9,590,686 B2 * 3/2017 Black ................... H03H 7/0153
9,698,854 B2 * 7/2017 Mow ........................ H01Q 3/26
9,716,477 B2 * 7/2017 Wagh .................... H03F 1/3247
9,860,050 B1 * 1/2018 Noolu ....................... H04L 5/14
9,923,271 B2 * 3/2018 Hyde ..................... H01Q 13/28
10,097,217 B2 * 10/2018 Manteghi ................. H04B 1/04
10,243,519 B2 * 3/2019 Dykstra ................ H03F 1/0227
10,673,145 B2 * 6/2020 Hyde ................. H01Q 15/0086
10,790,817 B2 * 9/2020 Murphy ............... H03K 17/687
11,051,744 B2 * 7/2021 Levine ............... A61N 1/37205
11,277,036 B2 * 3/2022 Morioka ................. H02J 50/27
11,482,988 B1 * 10/2022 Kliss ...................... H03H 11/44
11,621,585 B2 * 4/2023 Karalis ................. B60L 53/126 307/104
11,664,601 B2 * 5/2023 Irci ........................ H01Q 1/243 343/770
11,870,398 B2 * 1/2024 Ranta .................... H03F 1/3205
11,908,901 B1 * 2/2024 Koester .................... H10D 1/64
12,089,136 B2 * 9/2024 Silver ..................... H04W 4/90
12,186,563 B2 * 1/2025 Yakovlev ............. A61B 5/0022
2008/0242240 A1 * 10/2008 Rofougaran ........... H04B 1/406 455/73
2008/0284674 A1 * 11/2008 Herz .................... H01Q 21/065 343/909
2011/0043401 A1 2/2011 Li
2011/0250926 A1 * 10/2011 Wietfeldt ............... H01Q 1/243 455/525
2012/0268074 A1 * 10/2012 Cooley ............... E21B 41/0085 320/167
2013/0099587 A1 * 4/2013 Lou ......................... H02J 3/381 307/104
2013/0122836 A1 * 5/2013 Desclos ................... H04B 1/04 455/121
2014/0057580 A1 * 2/2014 Rofougaran ......... H04B 1/0067 455/77
2015/0109178 A1 * 4/2015 Hyde ..................... H01Q 13/28 343/772
2016/0254817 A1 9/2016 Vahid Far et al.
2017/0244172 A1 * 8/2017 Hyde ..................... H01Q 13/20
2018/0157146 A1 * 6/2018 Park ...................... G01S 7/4911
2019/0238375 A1 8/2019 Bowen et al.
2020/0106394 A1 * 4/2020 Thoppay Egambaram ................. H03F 3/195
2020/0358319 A1 * 11/2020 Karalis ................... H02J 50/12
2021/0313683 A1 * 10/2021 Lipworth ............... H01Q 3/443
2023/0299479 A1 * 9/2023 Eylander ................ H01Q 15/24 342/372

OTHER PUBLICATIONS

International Search Report and Written Opinion on the Patentability of Application No. PCT/US2022041098 Mailed Mar. 8, 2022, 11 pages.

Office Action received for Taiwanese Patent Application No. 111131364, mailed on Jan. 13, 2025, 12 pages (5 pages of English Translation and 7 pages of Original Document).

Notice of Allowance received in related Taiwan Application No. 111131364, mailed Jan. 7, 2026, 8 pages.

* cited by examiner

DRIVING METHODS TO MINIMIZE THE EFFECT OF LEAKAGE CURRENT IN TUNABLE ELEMENTS

RELATED APPLICATION

The present application is a non-provisional application of and claims the benefit of U.S. Provisional Patent Application No. 63/235,514, filed Aug. 20, 2021 and entitled "DRIVING METHODS TO MINIMIZE THE EFFECT OF LEAKAGE CURRENT IN TUNABLE ELEMENTS", which is incorporated by reference in its entirety.

FIELD OF THE DISCLOSURE

Embodiments of the present disclosure are related to wireless communication; more particularly, to driving tunable elements of antenna elements of an antenna.

BACKGROUND

Metasurface antennas have recently emerged as a new technology for generating steered, directive beams from a lightweight, low-cost, and planar physical platform. Such metasurface antennas have been recently used in a number of applications, such as, for example, satellite communication.

Metasurface antennas may comprise metamaterial antenna elements that can selectively couple energy from a feed wave to produce beams that may be controlled for use in communication. These antennas are capable of achieving comparable performance to phased array antennas from an inexpensive and easy-to-manufacture hardware platform.

SUMMARY

Antennas with tunable elements and methods for using the same are disclosed. In some embodiments, an antenna comprises: a plurality of radio-frequency (RF) radiating antenna elements, wherein each antenna element of the plurality of RF radiating antenna elements comprises a tunable element, and circuitry connected to the tuning element to set a voltage on the tunable element. In some embodiments, the circuitry comprises a voltage storage structure, a first transistor having a first gate connected to the voltage storage structure, a first source connected to the tunable element, and a first drain for coupling to a constant voltage source, and a data voltage input terminal operable to apply a voltage to the voltage storage structure and to the first gate to determine current through the first transistor.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
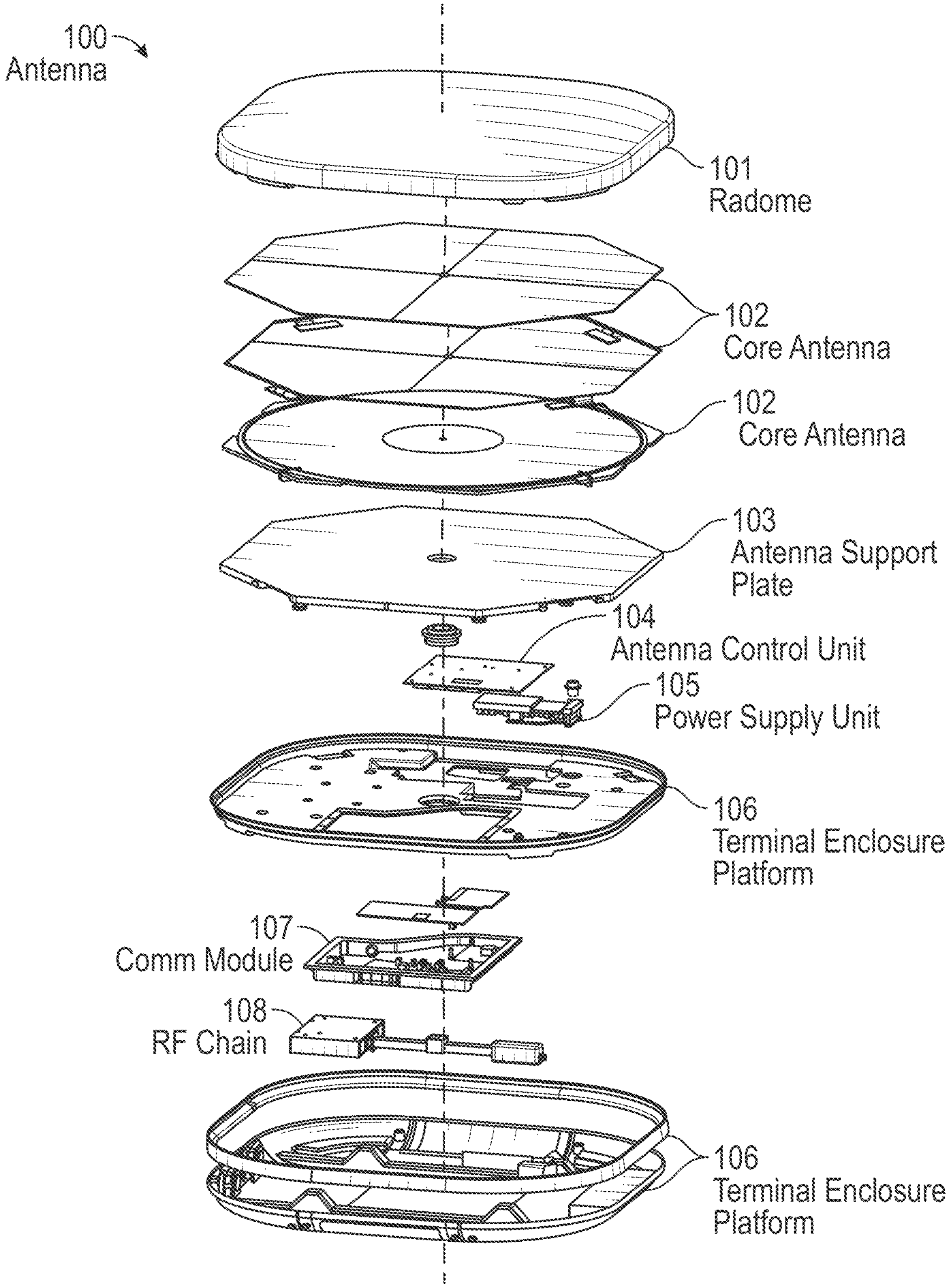
FIG. 1 illustrates an exploded view of some embodiments of a flat-panel antenna.

In the following description, numerous details are set forth to provide a more thorough explanation of embodiments of the present disclosure. It will be apparent, however, to one skilled in the art, that the teachings disclosed herein may be practiced without these specific details. In other instances, well-known structures and devices are shown in block diagram form, rather than in detail, in order to avoid obscuring the present disclosure.

Embodiments described herein include an antenna having circuits that compensate for leakage current associated with antenna elements. In some embodiments, the antenna comprises a metasurface with radio-frequency (RF) radiating antenna elements having tunable elements. In some embodiments, the tunable elements comprise capacitive tunable elements. In some embodiments, the metasurface comprises a metasurface RF antenna pixel circuit associated with each antenna element for reducing the voltage drop on an antenna pixel (element) due to leakage current of a capacitive tunable element.

The following disclosure discusses examples of antenna embodiments followed by examples of circuits that drive antenna elements while reducing, and potentially minimizing, the effect of leakage currents in tunable elements that are part of antenna elements that radiate RF energy.

Examples of Antenna Embodiments

The techniques described herein may be used with a variety of flat panel satellite antennas. Embodiments of such flat panel antennas are disclosed herein. In some embodiments, the flat panel satellite antennas are part of a satellite terminal. The flat panel antennas include one or more arrays of antenna elements on an antenna aperture.

In some embodiments, the antenna aperture is a metasurface antenna aperture, such as, for example, the antenna apertures described below. In some embodiments, the antenna elements comprise radio-frequency (RF) radiating antenna elements. In some embodiments, the antenna elements include tunable devices to tune the antenna elements. Examples of such tunable devices include diodes and varactors such as, for example, described in U.S. Patent Application Publication No. 20210050671, entitled "Metasurface Antennas Manufactured with Mass Transfer Technologies," published Feb. 18, 2021. In some other embodiments, the antenna elements comprise liquid crystal (LC)-based antenna elements, such as, for example, those disclosed in U.S. Pat. No. 9,887,456, entitled "Dynamic Polarization and Coupling Control from a Steerable Cylindrically Fed Holographic Antenna", issued Feb. 6, 2018, or other RF radiating antenna elements. It should be appreciated that other tunable devices such as, for example, but not limited to, tunable capacitors, tunable capacitance dies, packaged dies, micro-electromechanical systems (MEMS) devices, or other tunable capacitance devices, could be placed into an antenna aperture or elsewhere in variations on the embodiments described herein.

In some embodiments, the antenna aperture having the one or more arrays of antenna elements is comprised of multiple segments that are coupled together. In some embodiments, when coupled together, the combination of the segments form groups of antenna elements (e.g., closed concentric rings of antenna elements concentric with respect to the antenna feed, etc.). For more information on antenna segments, see U.S. Pat. No. 9,887,455, entitled "Aperture Segmentation of a Cylindrical Feed Antenna", issued Feb. 6, 2018.

FIG. 1 illustrates an exploded view of some embodiments of a flat-panel antenna. Referring to FIG. 1, antenna 100 comprises a radome 101, a core antenna 102, antenna support plate 103, antenna control unit (ACU) 104, a power supply unit 105, terminal enclosure platform 106, comm (communication) module 107, and RF chain 108.

Radome 101 is the top portion of an enclosure that encloses core antenna 102. In some embodiments, radome 101 is weatherproof and is constructed of material transparent to radio waves to enable beams generated by core antenna 102 to extend to the exterior of radome 101.

In some embodiments, core antenna 102 comprises an aperture having RF radiating antenna elements. These antenna elements act as radiators (or slot radiators). In some embodiments, the antenna elements comprise scattering metamaterial antenna elements. In some embodiments, the antenna elements comprise both Receive (Rx) and Transmit (Tx) irises, or slots, that are interleaved and distributed on the whole surface of the antenna aperture of core antenna 102. Such Rx and Tx irises may be in groups of two or more sets where each set is for a separately and simultaneously controlled band. Examples of such antenna elements with irises are described in U.S. Pat. No. 10,892,553, entitled "Broad Tunable Bandwidth Radial Line Slot Antenna", issued Jan. 12, 2021.

In some embodiments, the antenna elements comprise irises (iris openings) and the aperture antenna is used to generate a main beam shaped by using excitation from a cylindrical feed wave for radiating the iris openings through tunable elements (e.g., diodes, varactors, patch, etc.). In some embodiments, the antenna elements can be excited to radiate a horizontally or vertically polarized electric field at desired scan angles.

In some embodiments, a tunable element (e.g., diode, varactor, patch etc.) is located over each iris slot. The amount of radiated power from each antenna element is controlled by applying a voltage to the tunable element using a controller in ACU 104. Traces in core antenna 102 to each tunable element are used to provide the voltage to the tunable element. The voltage tunes or detunes the capacitance and thus the resonance frequency of individual elements to effectuate beam forming. The voltage required is dependent on the tunable element in use. Using this property, in some embodiments, the tunable element (e.g., diode, varactor, LC, etc.) integrates an on/off switch for the transmission of energy from a feed wave to the antenna element. When switched on, an antenna element emits an electromagnetic wave like an electrically small dipole antenna. Note that the teachings herein are not limited to having unit cell that operates in a binary fashion with respect to energy transmission. For example, in some embodiments in which varactors are the tunable element, there are 32 tuning levels. As another example, in some embodiments in which LC is the tunable element, there are 16 tuning levels.

A voltage between the tunable element and the slot can be modulated to tune the antenna element (e.g., the tunable resonator/slot). Adjusting the voltage varies the capacitance of a slot (e.g., the tunable resonator/slot). Accordingly, the reactance of a slot (e.g., the tunable resonator/slot) can be varied by changing the capacitance. Resonant frequency of the slot also changes according to the equation $$f = \frac{1}{2\pi\sqrt{LC}}$$

where f is the resonant frequency of the slot and L and C are the inductance and capacitance of the slot, respectively. The resonant frequency of the slot affects the energy coupled from a feed wave propagating through the waveguide to the antenna elements.

In particular, the generation of a focused beam by the metamaterial array of antenna elements can be explained by the phenomenon of constructive and destructive interference, which is well known in the art. Individual electromagnetic waves sum up (constructive interference) if they have the same phase when they meet in free space to create a beam, and waves cancel each other (destructive interference) if they are in opposite phase when they meet in free space. If the slots in core antenna 102 are positioned so that each successive slot is positioned at a different distance from the excitation point of the feed wave, the scattered wave from that antenna element will have a different phase than the scattered wave of the previous slot. In some embodiments, if the slots are spaced one quarter of a wavelength apart, each slot will scatter a wave with a one fourth phase delay from the previous slot. In some embodiments, by controlling which antenna elements are turned on or off (i.e., by changing the pattern of which antenna elements are turned on and which antenna elements are turned off) or which of the multiple tuning levels is used, a different pattern of constructive and destructive interference can be produced, and the antenna can change the direction of its beam(s).

In some embodiments, core antenna 102 includes a coaxial feed that is used to provide a cylindrical wave feed via an input feed, such as, for example, described in U.S. Pat. No. 9,887,456, entitled "Dynamic Polarization and Coupling Control from a Steerable Cylindrically Fed Holographic Antenna", issued Feb. 6, 2018 or in U.S. Patent Application Publication No. 20210050671, entitled "Metasurface Antennas Manufactured with Mass Transfer Technologies," published Feb. 18, 2021. In some embodiments, the cylindrical wave feed feeds core antenna 102 from a central point with an excitation that spreads outward in a cylindrical manner from the feed point. In other words, the cylindrically fed wave is an outward travelling concentric feed wave. Even so, the shape of the cylindrical feed antenna around the cylindrical feed can be circular, square or any shape. In some other embodiments, a cylindrically fed antenna aperture creates an inward travelling feed wave. In such a case, the feed wave most naturally comes from a circular structure.

In some embodiments, the core antenna comprises multiple layers. These layers include the one or more substrate layers forming the RF radiating antenna elements. In some embodiments, these layers may also include impedance matching layers (e.g., a wide-angle impedance matching (WAIM) layer, etc.), one or more spacer layers and/or dielectric layers. Such layers are well-known in the art.

Antenna support plate 103 is coupled to core antenna 102 to provide support for core antenna 102. In some embodiments, antenna support plate 103 includes one or more waveguides and one or more antenna feeds to provide one or more feed waves to core antenna 102 for use by antenna elements of core antenna 102 to generate one or more beams.

ACU 104 is coupled to antenna support plate 103 and provides controls for antenna 100. In some embodiments, these controls include controls for drive electronics for antenna 100 and a matrix drive circuitry to control a switching array interspersed throughout the array of RF radiating antenna elements. In some embodiments, the matrix drive circuitry uses unique addresses to apply voltages onto the tunable elements of the antenna elements to drive each antenna element separately from the other antenna elements. In some embodiments, the drive electronics for ACU 104 comprise commercial off-the shelf LCD controls used in commercial television appliances that adjust the voltage for each antenna element.

More specifically, in some embodiments, ACU 104 supplies an array of voltage signals to the tunable devices of the antenna elements to create a modulation, or control, pattern. The control pattern causes the elements to be tuned to different states. In some embodiments, ACU 104 uses the control pattern to control which antenna elements are turned on or off (or which of the tuning levels is used) and at which phase and amplitude level at the frequency of operation. The elements are selectively detuned for frequency operation by voltage application. In some embodiments, multistate control is used in which various elements are turned on and off to varying levels, further approximating a sinusoidal control pattern, as opposed to a square wave (i.e., a sinusoid gray shade modulation pattern).

In some embodiments, ACU 104 also contains one or more processors executing the software to perform some of the control operations. ACU 104 may control one or more sensors (e.g., a GPS receiver, a three-axis compass, a 3-axis accelerometer, 3-axis gyro, 3-axis magnetometer, etc.) to provide location and orientation information to the processor (s). The location and orientation information may be provided to the processor(s) by other systems in the earth station and/or may not be part of the antenna system.

Antenna 100 also includes a comm (communication) module 107 and an RF chain 108. Comm module 107 includes one or more modems enabling antenna 100 to communicate with various satellites and/or cellular systems, in addition to a router that selects the appropriate network route based on metrics (e.g., quality of service (QoS) metrics, e.g., signal strength, latency, etc.). RF chain 108 converts analog RF signals to digital form. In some embodiments, RF chain 108 comprises electronic components that may include amplifiers, filters, mixers, attenuators, and detectors.

Antenna 100 also includes power supply unit 105 to provide power to various subsystems or parts of antenna 100.

Antenna 100 also includes terminal enclosure platform 106 that forms the enclosure for the bottom of antenna 100. In some embodiments, terminal enclosure platform 106 comprises multiple parts that are coupled to other parts of antenna 100, including radome 101, to enclose core antenna 102.

Figure 2:
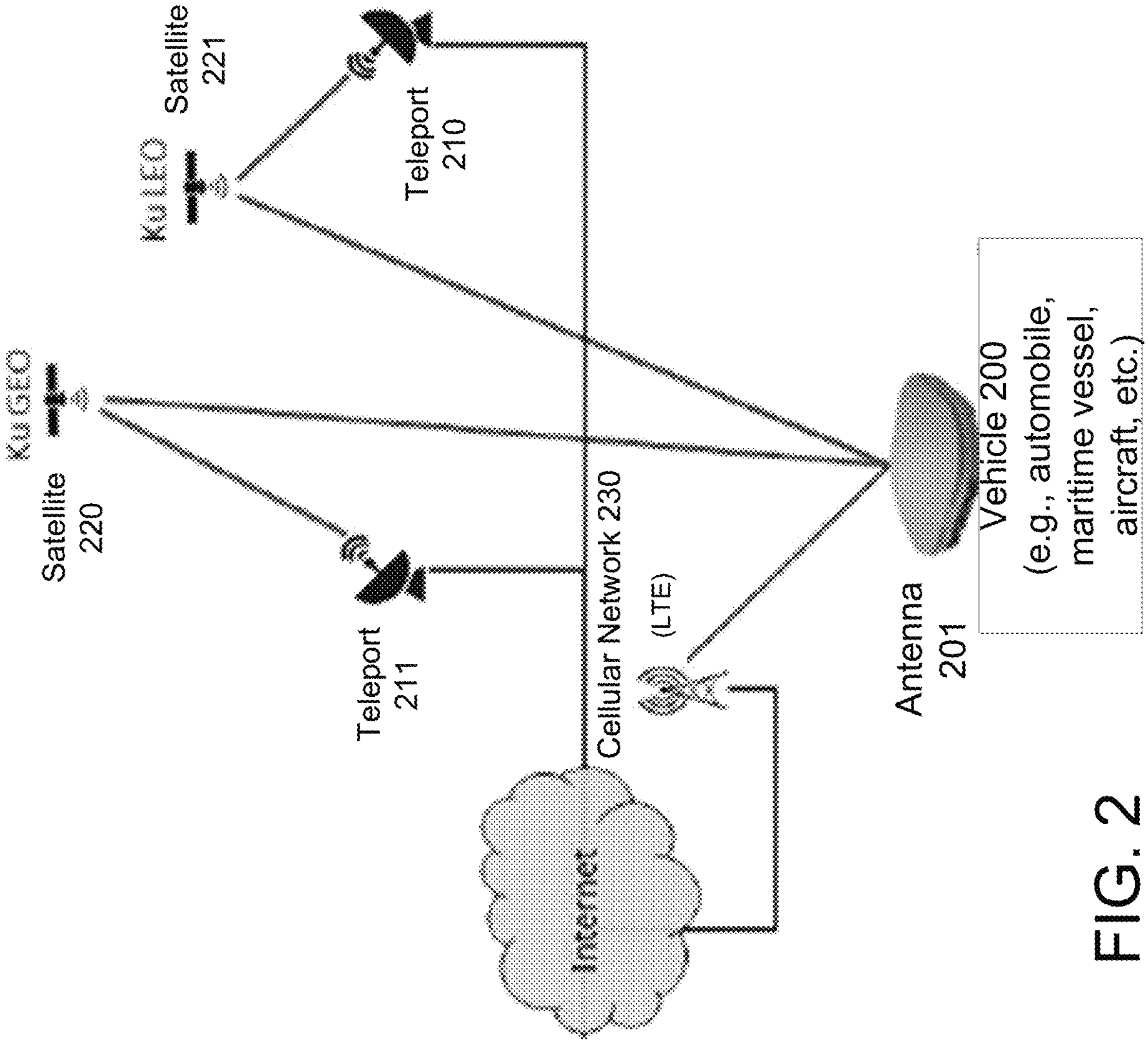
FIG. 2 illustrates an example of a communication system that includes one or more antennas described herein.

FIG. 2 illustrates an example of a communication system that includes one or more antennas described herein. Referring to FIG. 2, vehicle 200 includes an antenna 201. In some embodiments, antenna 201 comprises antenna 100 of FIG. 1.

In some embodiments, vehicle 200 may comprise any one of several vehicles, such as, for example, but not limited to, an automobile (e.g., car, truck, bus, etc.), a maritime vehicle (e.g., boat, ship, etc.), airplanes (e.g., passenger jets, military jets, small craft planes, etc.), etc. Antenna 201 may be used to communicate while vehicle 200 is either on-the-pause, or moving. Antenna 201 may be used to communicate to fixed locations as well, e.g., remote industrial sites (mining, oil, and gas) and/or remote renewable energy sites (solar farms, windfarms, etc.).

In some embodiments, antenna 201 is able to communicate with one or more communication infrastructures (e.g., satellite, cellular, networks (e.g., the Internet), etc.). For example, in some embodiments, antenna 201 is able to communication with satellites 220 (e.g., a GEO satellite) and 221 (e.g., a LEO satellite), cellular network 230 (e.g., an LTE, etc.), as well as network infrastructures (e.g., edge routers, Internet, etc.). For example, in some embodiments, antenna 201 comprises one or more satellite modems (e.g., a GEO modem, a LEO modem, etc.) to enable communication with various satellites such as satellite 220 (e.g., a GEO satellite) and satellite 221 (e.g., a LEO satellite) and one or more cellular modems to communicate with cellular network 230. For another example of an antenna communicating with one or more communication infrastructures, see U.S. patent Ser. No. 16/750,439, entitled "Multiple Aspects of Communication in a Diverse Communication Network", and filed Jan. 23, 2020.

In some embodiments, to facilitate communication with various satellites, antenna 201 performs dynamic beam steering. In such a case, antenna 201 is able to dynamically change the direction of a beam that it generates to facilitate communication with different satellites. In some embodiments, antenna 201 includes multi-beam beam steering that allows antenna 201 to generate two or more beams at the same time, thereby enabling antenna 201 to communication with more than one satellite at the same time. Such functionality is often used when switching between satellites (e.g., performing a handover). For example, in some embodiments, antenna 201 generates and uses a first beam for communicating with satellite 220 and generates a second beam simultaneously to establish communication with satellite 221. After establishing communication with satellite 221, antenna 201 stops generating the first beam to end communication with satellite 220 while switching over to communicate with satellite 221 using the second beam. For more information on multi-beam communication, see U.S. Pat. No. 11,063,661, entitled "Beam Splitting Hand Off Systems Architecture", issued Jul. 13, 2021.

In some embodiments, antenna 201 uses path diversity to enable a communication session that is occurring with one communication path (e.g., satellite, cellular, etc.) to continue during and after a handover with another communication path (e.g., a different satellite, a different cellular system, etc.). For example, if antenna 201 is in communication with satellite 220 and switches to satellite 221 by dynamically changing its beam direction, its session with satellite 220 is combined with the session occurring with satellite 221. Thus, the antennas described herein may be part of a satellite terminal that enables ubiquitous communications and multiple different communication connections.

In some embodiments, the metasurface RF antenna includes multiple RF radiating antenna elements that are tuned to desired frequencies using drive circuitry. In some embodiments, the drive circuitry comprises an active-matrix drive. In some embodiments, the frequency of each antenna element is controlled by an applied voltage. In some embodiments, this applied voltage is also stored in each antenna pixel until the next voltage writing cycle.

Figure 3:
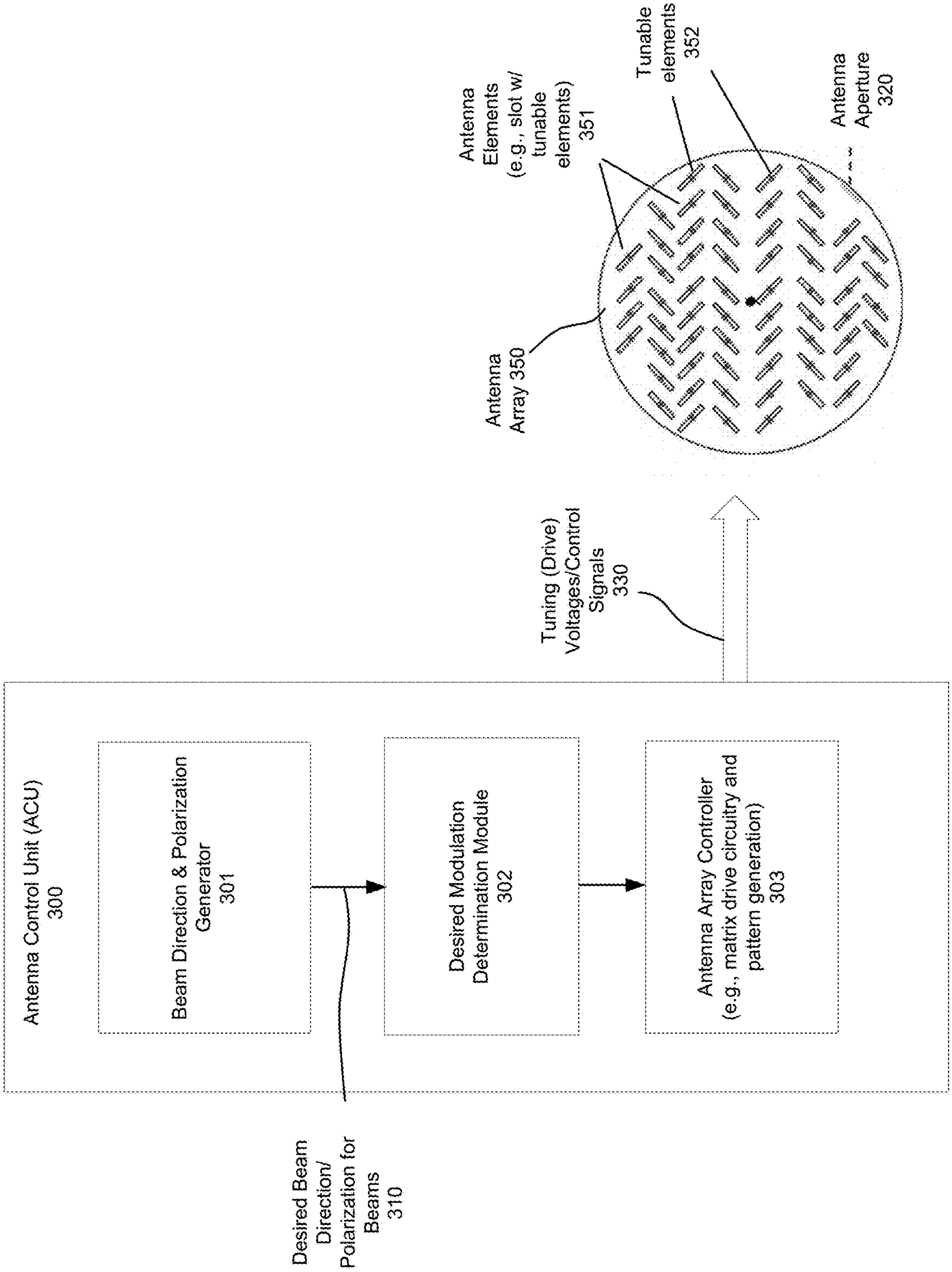
FIG. 3 illustrates some embodiments of an antenna with an antenna control unit (ACU).

FIG. 3 illustrates some embodiments of an antenna with an antenna control unit (ACU) 300 that generates the modulation for the array of antenna elements. In some embodiments, the ACU comprises hardware (e.g., circuitry, dedicated logic, etc.), software (e.g., software running on a chip(s) or processor(s), etc.), firmware, or a combination of the three.

Referring to FIG. 3, antenna aperture 320 includes an array 350 of antenna elements 351. In some embodiments, antenna aperture 320 comprises a metasurface and array 350 comprises an array of metasurface radio-frequency (RF) antenna elements. In some embodiments, antenna elements 351 comprise slots, or irises, with a tunable element 352 over each of the slots. In some embodiments, the tunable device comprises a voltage-controlled tunable-capacitive device. In some other embodiments, the tunable element comprises a varactor (e.g., reverse-biased diode, etc.). In some other embodiments, tunable element 352 comprises a Microelectromechanical systems (MEMS) capacitor. The use and operation of such tunable elements is well-known in the art. For more information, see U.S. patent application Ser. No. 16/991,924, entitled "Metasurface Antennas Manufactured with Mass Transfer Technologies," filed Aug. 12, 2020.

A beam direction and polarization generator 301 of ACU 300 generates beam directions and polarizations 310 for the one or more beams and provides these to beam modulation determination module 302. In response, beam modulation determination module 302 generates the modulation for antenna elements 351. In some embodiments, beam modulation determination module 302 generates the modulation by determining the modulation for each beam. In some embodiments, beam modulation determination module 302 combines multiple modulations into one modulation by, for example, averaging the modulations. For more information, see U.S. patent Ser. No. 17/103,742, entitled "Bandwidth Adjustable Euclidean Modulation, filed Nov. 24, 2020 and U.S. Pat. No. 10,686,636, entitled "Restricted Euclidean Modulation", issued Jun. 16, 2020.

An antenna array controller 303 of ACU 300 generates tuning (drive) voltages and control signals 330 that are sent to antenna elements 351 in array 350. In some embodiments, antenna array controller 33 comprises a matrix drive with a pattern generator. The operation of a matrix drive is well-known in the art. For example, see U.S. Pat. No. 9,905,921, entitled "Antenna Element Placement for a Cylindrical Feed Antenna". Based on the tuning voltages and control signals 330, antenna elements 351 generate one or more beams.

Figure 4:
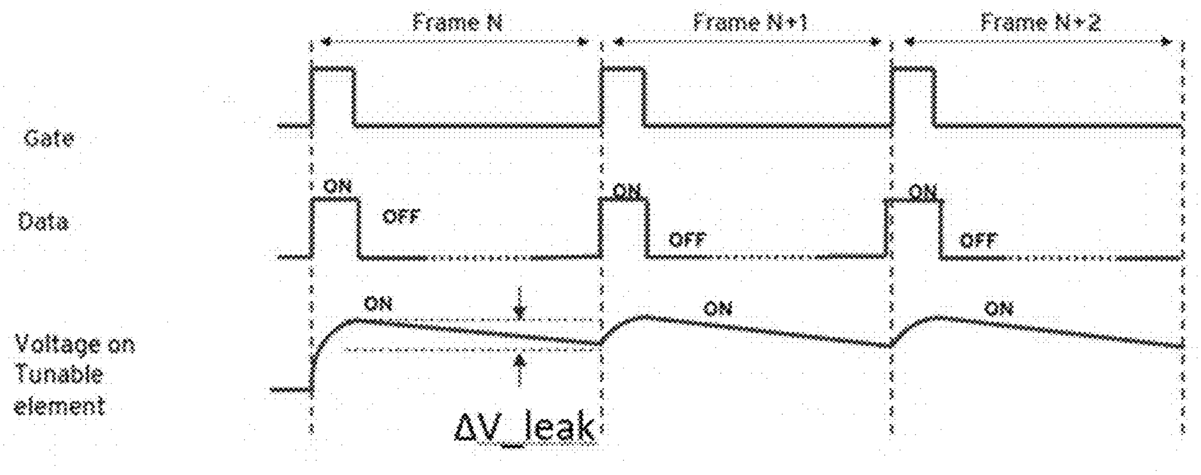
FIG. 4 illustrates voltage degradation of a tunable element over time due to leakage.

In some embodiments, a metasurface RF antenna element includes multiple circuit elements with a tunable device. These tunable circuit elements can have leakage currents that degrade the voltage stored in an antenna pixel over time until the pixel voltage is refreshed in the next writing cycle. FIG. 4 illustrates voltage degradation over time due to leakage. Referring to FIG. 4, during each of frames N to N+2, when the gate is turned on and the data voltage is on, the voltage on the tunable element is on. However, the amount of voltage on the tunable element decreases over the length of the frame. This voltage degradation is due to leakage. A degradation in stored voltage will cause a shift in the frequency of the antenna element over time and adversely affect the antenna performance.

Figure 5:
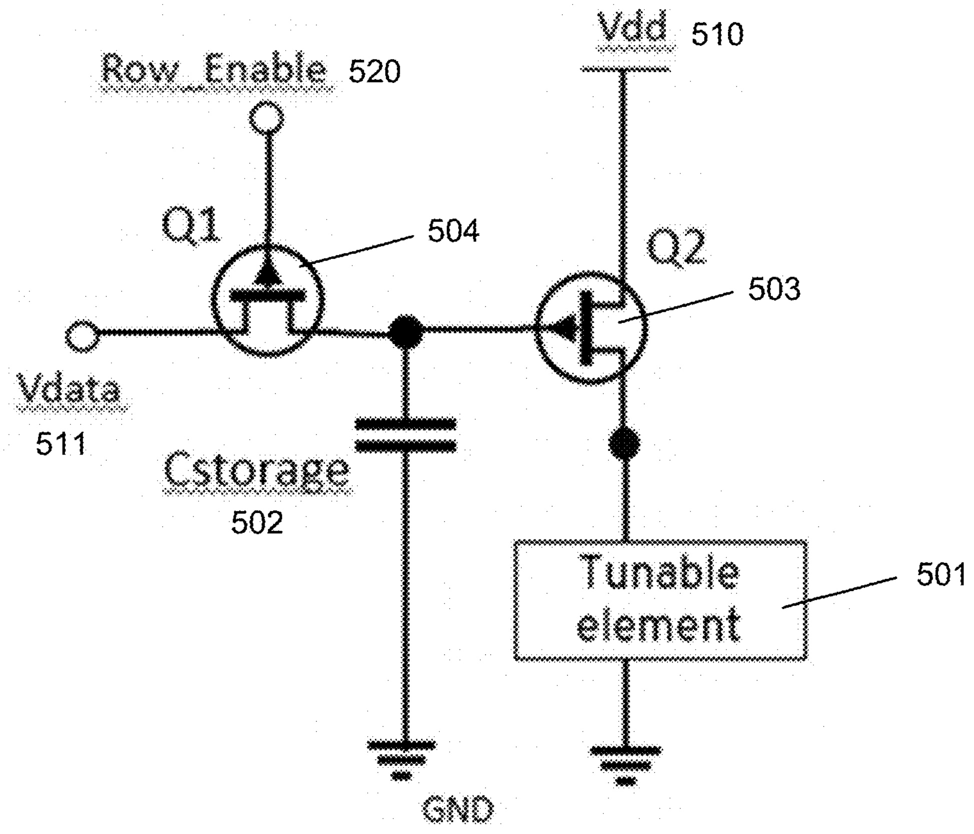
FIG. 5 illustrates some embodiments of a circuit with a current-controlled tunable element.

In some embodiments, to prevent this voltage degradation, a voltage storage structure is decoupled from the leakage current path. FIG. 5 illustrates a circuit with a current-controlled tunable element that may be used for this purpose. Referring to FIG. 5, tunable element 501 is connected between a source of Q2 transistor 503 and ground. In some other embodiments, tunable element 501 comprises a varactor. In some other embodiments, tunable element 501 comprises a Microelectromechanical systems (MEMS) capacitor. In some embodiments, transistor 503 is a thin film transistor. In some embodiments, Q2 transistor 503 is a Field Effect Transistor (FET) (e.g., Junction Field Effect Transistor (JFET), etc.). The drain of Q2 transistor 503 is connected to Vdd 510, which represents the drain-to-source voltage. In some embodiments, Vdd 510 is a constant voltage source and is between 1-20 volts. The gate of Q2 transistor 503 is connected to a terminal of a voltage storage structure 502. In some embodiments, voltage storage structure 502 comprises a storage capacitor. In some embodiment, the storage capacitor is 1-3 picofarads in size. The other terminal of voltage storage structure 502 is connected to ground. The gate of Q2 transistor 503 is also connected to a source of Q1 transistor 504. In some embodiments, Q1 transistor 504 is a thin film transistor. In some embodiments, Q1 transistor 504 is a Field Effect Transistor (FET) (e.g., Junction Field Effect Transistor (JFET), etc.) . The gate of Q1 transistor 504 is connected to an enable input 520. In some embodiments, enable input 520 is connected to a row enable signal from a matrix drive controller of an antenna that causes a tuning voltage to be applied to tunable element 501. The drain of Q1 transistor 504 is connected to a data voltage 511.

During operation, the data (or grey level) information 511 is written into the voltage storage structure, storage capacitor (Cstorage) 502, when the voltage on Row_Enable 520 from a matrix drive controller is high and Q1 transistor 504 is ON. This voltage is applied to the gate of Q2 transistor 503 to determine the current going through it, thereby acting as a current source. The drain to source voltage for Q2 transistor 503, namely Vdd 510, is a constant voltage source. The same current going through Q2 transistor 503 will flow through tunable element 501 and set a voltage "V_tune" on tunable element 501 according to its current vs voltage characteristic. This V_tune voltage determines the capacitance of tunable element 501 according to its capacitance vs voltage characteristic, which in some embodiments is used as part of an antenna element. Q2 transistor 503 acts as a constant current source for tunable element 501 and this current will not cause any degradation in the voltage on tunable element 501. In some embodiments, this circuit topology may have a variation in the transistor current due to variation of transistor characteristics among these Q2 transistors within an antenna aperture, or portion thereof (e.g., an antenna segment as described, for example, in U.S. Pat. No. 9,887,455, entitled "Aperture Segmentation of a Cylindrical Feed Antenna"). Those variations could cause variations in transistor current of Q2 transistor 503 when the same Vdata 511 is applied to different antenna elements. The result of these variations is that different voltages will be set on the antenna elements, thereby causing capacitance and frequency differences.

Figure 6:
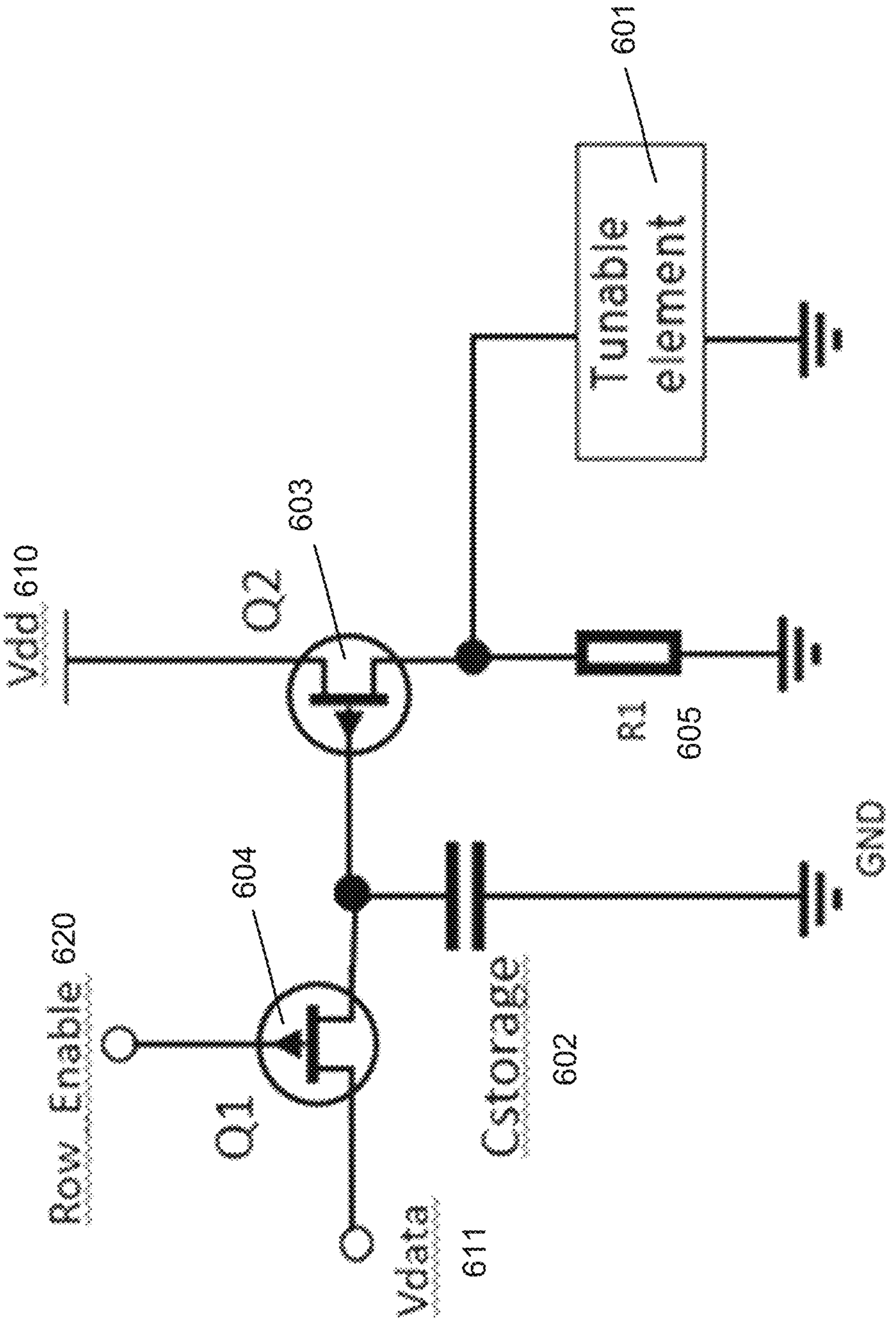
FIG. 6 illustrates some embodiments of a circuit with a voltage-controlled tunable element.

FIG. 6 illustrates an alternative circuit to the one shown in FIG. 5. Referring to FIG. 6, tunable element 601 is a voltage-controlled tunable element and is connected between a source of Q2 transistor 603 and ground. In some other embodiments, tunable element 601 comprises a varactor. In some other embodiments, tunable element 601 comprises a Microelectromechanical systems (MEMS) capacitor. In some embodiments, Q2 transistor 603 is a thin film transistor. In some embodiments, Q2 transistor 603 is a Field Effect Transistor (FET) (e.g., Junction Field Effect Transistor (JFET), etc.).

A resistor 605 is connected in parallel to tunable element 601 between the source of Q2 transistor 603 and ground. The drain of Q2 transistor 603 is connected to Vdd 610, which represents the drain-to-source voltage. In some embodiments, Vdd 610 is a constant voltage source and is between 1-20 volts. The gate of Q2 transistor 603 is connected to a terminal of a voltage storage structure 602. In some embodiments, voltage storage structure 602 comprises a storage capacitor. In some embodiment, the storage capacitor is 1-3 picofarads in size. The other terminal of voltage storage structure 602 is connected to ground. The gate of Q2 transistor 603 is also connected to a source of Q1 transistor 604. In some embodiments, Q1 transistor 604 is a thin film transistor. In some embodiments, Q1 transistor 604 is a Field Effect Transistor (FET) (e.g., Junction Field Effect Transistor (JFET), etc.). The gate of Q1 transistor 604 is connected to an enable input 620. In some embodiments, enable input 620 is connected to a row enable signal from a matrix drive controller of an antenna that causes a tuning voltage to be applied to tunable element 601. The drain of Q1 transistor 604 is connected to a data voltage 611.

The operation of the circuit in FIG. 6 is similar to the circuit in FIG. 5. The data voltage 611 is written and stored in voltage storage structure, Cstorage 602, and applied to the gate of Q2 transistor 603 to determine its current. The majority of this current (I_q2) flows through R1 resistor 605 since the leakage current through tunable element 601 is very small compared to current of Q2 transistor 603. The voltage on R1 resistor 605 is determined as V_R1=R1*I_q2. In some embodiments, the same voltage is applied to tunable element 601 in parallel to resistor 605. Q2 transistor 603 still acts as a current source for the leakage current through tunable element 601 and this current doesn't degrade Vdata 611 that is applied to the gate of Q2 transistor 603. In some embodiments, this circuit does have increased power consumption over the circuit of FIG. 5 and its usage may depend on the values of Vdd 610 and I_q2.

Figure 7B:
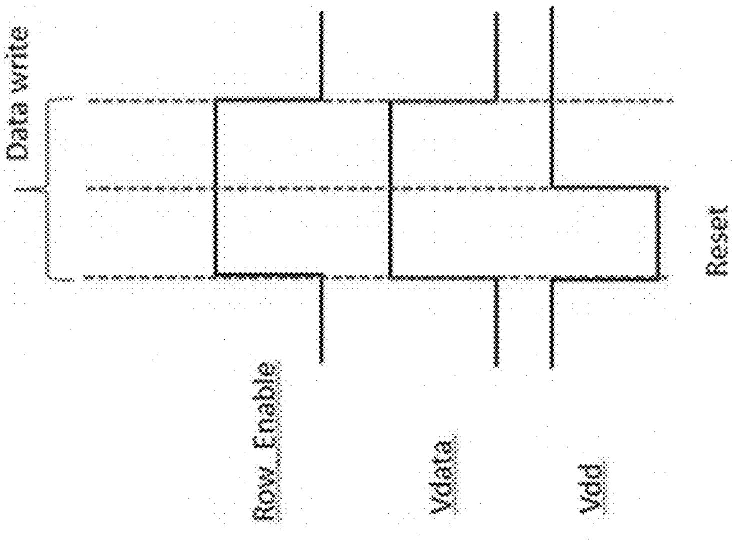
FIG. 7B illustrates a waveform to control a constant voltage source for a voltage-controlled tunable element.
Figure 7A:
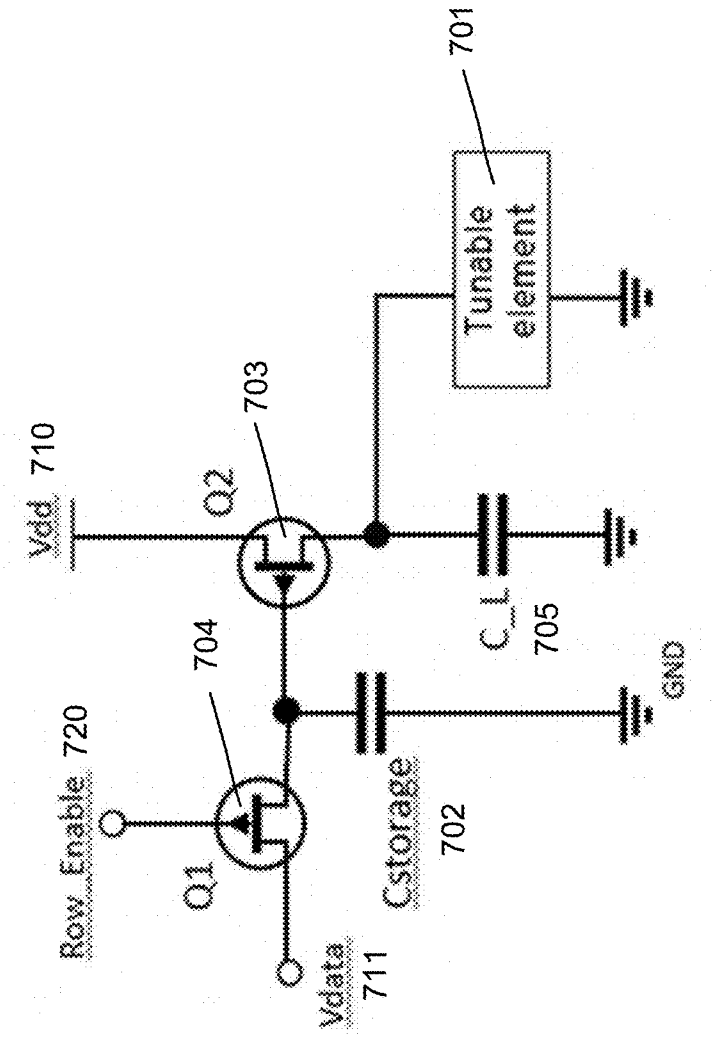
FIG. 7A illustrates another alternative circuit with a voltage-controlled tunable element.

FIG. 7A illustrates another alternative circuit that may be used to reduce leakage current on a tunable element. In this case, the circuit uses a capacitive load rather than a resistive load to control the voltage on the tunable element. Referring to FIG. 7A, tunable element 701 is a voltage-controlled tunable element and is connected between a source of Q2 transistor 703 and ground. In some other embodiments, tunable element 701 comprises a varactor. In some other embodiments, tunable element 701 comprises a Microelectromechanical systems (MEMS) capacitor.

A capacitive load 705 is connected in parallel to tunable element 701 between the source of Q2 transistor 703 and ground. In some embodiments, Q2 transistor 703 is a thin film transistor. In some embodiments, Q2 transistor 703 is a Field Effect Transistor (FET) (e.g., Junction Field Effect Transistor (JFET), etc.). The drain of Q2 transistor 703 is connected to Vdd 710, which represents the drain-to-source voltage. In some embodiments, Vdd 710 is a constant voltage source and is between 1 and 20 volts. The gate of Q2 transistor 703 is connected to a terminal of a voltage storage structure 702. In some embodiments, voltage storage structure 502 comprises a storage capacitor. In some embodiment, the storage capacitor is 1-3 picofarads in size. The other terminal of voltage storage structure 702 is connected to ground. The gate of Q2 transistor 703 is also connected to a source of Q1 transistor 704. In some embodiments, Q1 transistor 704 is a thin film transistor. In some embodiments, Q1 transistor 704 is a Field Effect Transistor (FET) (e.g., Junction Field Effect Transistor (JFET), etc.). The gate of Q1 transistor 704 is connected to an enable input 720. In some embodiments, enable input 720 is connected to a row enable signal from a matrix drive controller of an antenna that causes a tuning voltage to be applied to tunable element 701. The drain of Q1 transistor 704 is connected to a data voltage 711.

The circuit of FIG. 7A operates in a similar manner to those circuits of FIGS. 5 and 6. Load capacitor (C_L) 705 will be charged through Q2 transistor 703 until its voltage reaches to:

$$V\_C\_L \; V\_Cstorage - Vth\_q2$$

where Vth_q2 is the threshold voltage of Q2 transistor 703. Additionally, Vdd 710 is not a constant voltage source in this circuit. In some embodiments, Vdd 710 is controlled using a separate driver integrated circuit (IC) (e.g., a timing controller) to supply the waveform shown in FIG. 7B. Load capacitor 705 is discharged in each frame (corresponding to each pattern refresh/update for the antenna elements) during data write by switching Vdd 710 to a low voltage. After data writing into voltage storage structure, Cstorage 702, is completed, load capacitor 705 is charged to the new voltage level through Q2 transistor 703. This circuit reduces the power consumption by not running a continuous current through the voltage source, Vdd 710. Instead, it charges load capacitor 705 and holds the charge in between data refreshes (e.g., driving a new pattern driven onto the antenna elements during each frame).

As shown in the equation for V_C_L, in some embodiments, the voltage on load capacitor 705 also depends on the threshold voltage of Q2 transistor 703. In some embodiments, this value will vary within an antenna aperture, or a portion thereof (e.g., a segment of an antenna as described, for example, in U.S. Pat. No. 9,887,455, entitled "Aperture Segmentation of a Cylindrical Feed Antenna") and can cause uniformity problems. However, such problems can be mitigated by using internal and external compensation methods for Vth variation.

In some embodiments, the circuits disclosed herein include or are coupled with additional compensation circuits. In some embodiments, the compensation applied by the compensation circuits is for compensating for variations in the voltage thresholds of transistors (e.g., Q2 transistors 503, 603, 703) in the antenna array. Such variations may be due to uniformity issues during manufacturing.

In some embodiments, the compensation circuits perform internal Vth compensation: In some embodiments, the circuit topology described above is changed by adding multiple transistors and/or capacitors to the circuit topology in order to add a reset period where the current through the Q2 transistor (e.g., 503, 603, 703) is set to 0 and the threshold voltage for the Q2 transistor, referred to herein as Vt_hq2, is stored on a capacitor, either Cstorage (e.g., 502, 602, 702) or an additional capacitor. This is added to Vdata during the data write period, so that the voltage applied to the gate (Vgs) of the Q2 transistor becomes:

$$Vgs\_q2 = Vdata + Vth\_q2$$

I_q2 is proportional to (Vgs_q2−Vth_q2) according to the transistor current-voltage relationship. Then I_q2 becomes independent of the threshold voltage variation since:

$$(Vgs\_q2-Vth\_q2)=Vdata+Vth\_q2-Vth\_q2=Vdata$$

Figure 8:
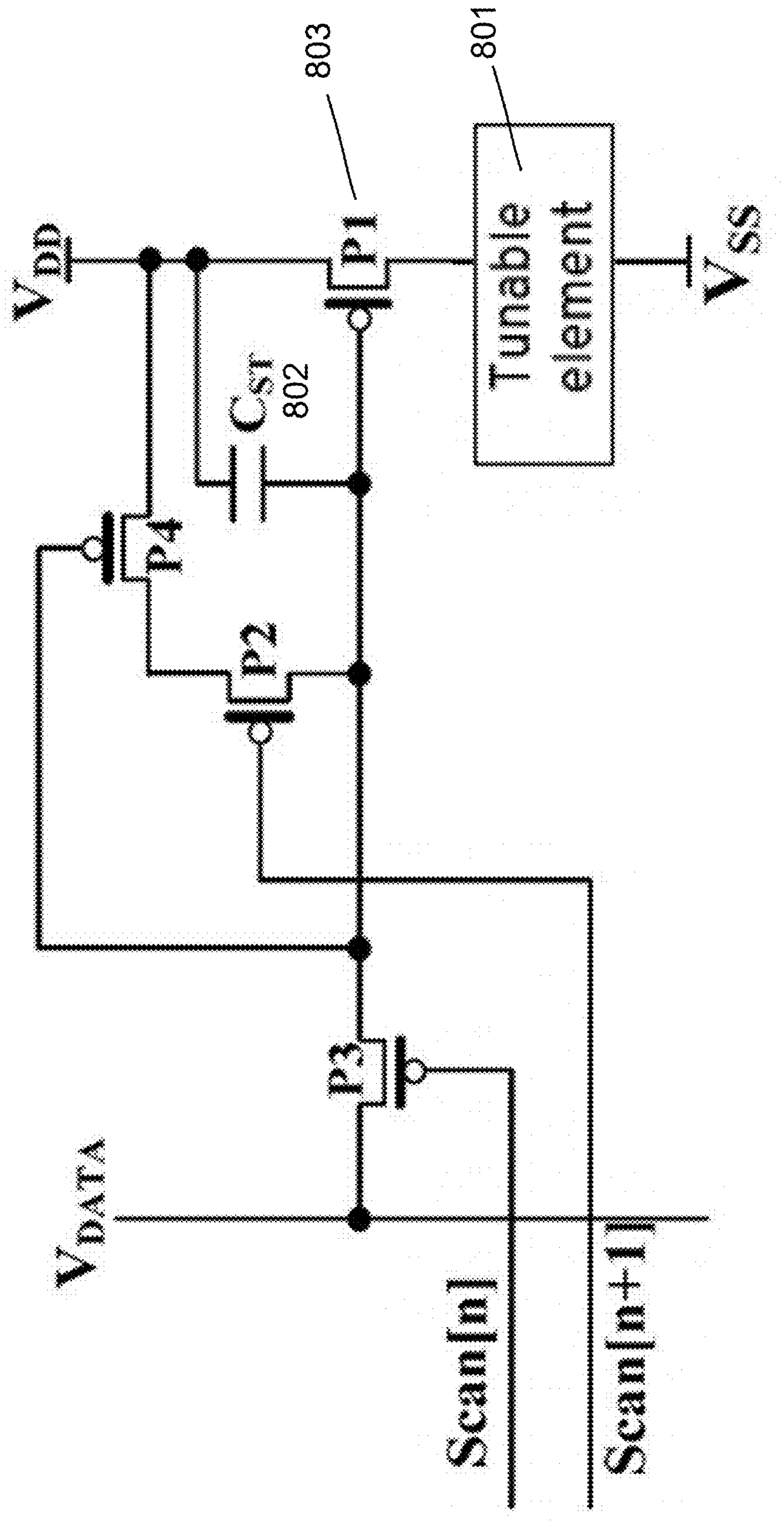
FIG. 8 illustrates some embodiments of a circuit that automatically calibrates the threshold voltage of the transistor.

FIG. 8 illustrates some embodiments of a circuit that automatically calibrates the threshold voltage of the transistor (e.g., the Q2 transistor (e.g., 503, 603, 703)). In this case, Vth is calibrated out by detecting a change in the threshold voltage and adding it on top of the data voltage being written In the circuit in FIG. 8, scan signals, Scan[n] and Scan [n+1] are provided from a row driver (or scan driver) of a matrix drive of the antenna, and capacitor Cst 802 gets an "additive" effect when Scan[n+1] is enabled. That is, Cst 802 is able to capture the threshold voltage and feed it back in to the circuitry. This is performed to "calibrate" the threshold voltage of P1 transistor 803 so that the current through P1 transistor 803 and tunable element 801 will have less variations.

In some other embodiments, external compensation is applied to compensation for the threshold voltage variations of the transistors (e.g., Q2 transistors (e.g., 503, 603, 703)). In some embodiments, the circuit topology is not changed for this compensation type, and the compensation is processed by an external unit. In some embodiments, the external unit resides in a control board (e.g., an antenna control unit) for the antenna and its antenna elements. In some embodiments, this external unit reads the threshold voltage Vth from each antenna element by applying a gate high to the element to turn on the Q1 transistor (e.g., transistor 504, 604, 704) and then reducing Vdd (e.g., 510, 610, 710) in steps to get to I_q2=0. In some embodiments, the current measuring and monitoring is performed by an antenna control unit (e.g., the antenna control unit of FIG. 1). In some embodiments, the voltage read through the Vdata line is equal to Vth_q2 when I_q2=0. Vth_q2 is then applied to this element during the array driving.

In some embodiments, visible LEDs are added in parallel with the tunable element. They can be used as a visual indicator to calibrate the entire antenna array across temperature if needed.

Figure 9:
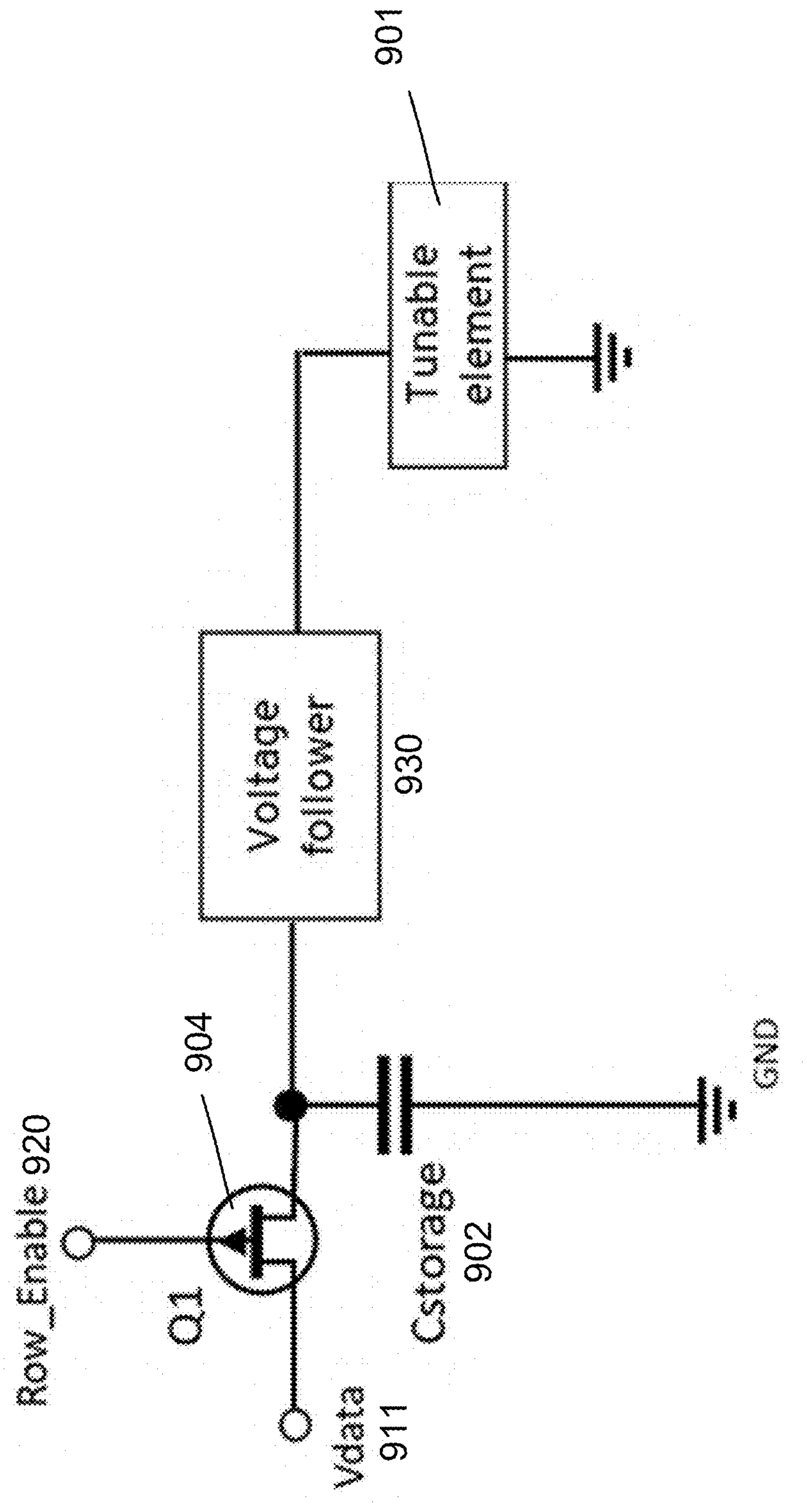
FIG. 9 is a circuit schematic of some embodiments of a voltage follower decoupling a tunable element from a voltage storage structure.

In another embodiment, the leakage through the tunable element is decoupled from the storage capacitor using a voltage follower circuit block between them. The voltage follower acts as a buffer in that it provides no amplification or attenuation to the signal, while providing impedance to the pixel circuit. FIG. 9 is a circuit schematic of some embodiments of such a voltage follower approach. Referring to FIG. 9, tunable element 901 is connected in series with voltage follower block 930 and is coupled to ground. In some other embodiments, tunable element 901 comprises a varactor. In some other embodiments, tunable element 901 comprises a Microelectromechanical systems (MEMS) capacitor. Voltage follower block 930 may be implemented with various circuit topologies well-known to those skilled in the art. Voltage follower block 930 is also connected to a terminal of voltage storage structure 902 (e.g., capacitive storage, etc.) and a source of Q1 transistor 904. The other terminal of voltage storage structure 902 is connected to ground. In some embodiments, Q1 transistor 904 is a thin film transistor. In some embodiments, Q1 transistor 904 is a Field Effect Transistor (FET) (e.g., Junction Field Effect Transistor (JFET), etc.). The gate of Q1 transistor 904 is connected to an enable input 920. In some embodiments, enable input 920 is connected to a row enable signal from a matrix drive controller of an antenna that causes a tuning voltage to be applied to tunable element 901. The drain of Q1 transistor 904 is connected to a data voltage 911. In the embodiment of FIG. 9, Q1 transistor 904, voltage storage structure 902, enable input 920 and data voltage 911 operate the same as their counterparts in FIGS. 5-7 along with tunable element 901.

In some embodiments, the circuit topologies presented herein are built using thin film transistor (TFT) technology based on various active materials, such as, but not limited to, amorphous silicon (a-Si) transistors, oxide transistors (e.g., Indium gallium zinc oxide-IGZO) and low-temperature polycrystalline silicon (LTPS) transistors. Additionally, they can also be built using a combination of those transistor technologies.

There are a number of example embodiments described herein.

Example 1 is an antenna comprising: a plurality of radio-frequency (RF) radiating antenna elements, wherein each antenna element of the plurality of RF radiating antenna elements comprises a tunable element, circuitry connected to the tuning element to set a voltage on the tunable element, the circuitry comprising a voltage storage structure, a first transistor having a first gate connected to the voltage storage structure, a first source connected to the tunable element, and a first drain for coupling to a constant voltage source, a data voltage input terminal operable to apply a voltage to the voltage storage structure and to the first gate to determine current through the first transistor.

Example 2 is the antenna of example 1 that may optionally include that the tunable element comprises a varactor or a MEMS capacitor.

Example 3 is the antenna of example 1 that may optionally include a matrix drive coupled to the circuitry, and wherein the circuitry further comprises a second transistor having a second gate coupled to an enable input controlled by the matrix drive, a second drain coupled to the data voltage input terminal, and a second source coupled to the first gate of the first transistor and the voltage storage structure.

Example 4 is the antenna of example 1 that may optionally include that the first transistor acts as a constant current source for the tunable element and the tunable element operates as a current-controlled tunable element when data voltage is applied to the first gate.

Example 5 is the antenna of example 1 that may optionally include that the circuitry further comprises a resistor coupled to the first source and coupled in parallel with the tunable element, wherein the tunable element operates as a voltage-controlled tunable element when data voltage is applied to the first gate.

Example 6 is the antenna of example 1 that may optionally include that the circuitry further comprises a capacitor load coupled in parallel with the tunable element, wherein the tunable element operates as a voltage-controlled tunable element when data voltage is applied to the first gate.

Example 7 is the antenna of example 1 that may optionally include that the circuitry further comprises reset circuitry to add a reset period during which the data voltage is applied to the first gate but no current flows through the first transistor.

Example 8 is the antenna of example 1 that may optionally include a compensation unit external to the circuitry and operable to adjust the data voltage to be applied to the first gate in order to compensate for non-uniformity in a threshold voltage of the first transistor with respect to other of the antenna elements.

Example 9 is the antenna of example 1 that may optionally include that the circuitry further comprises auto calibration circuitry coupled to a threshold voltage of the first gate in order to compensate for non-uniformity in the threshold voltage of the first transistor with respect to other of the antenna elements.

Example 10 is the antenna of example 1 that may optionally include that the first transistor comprises a thin film transistor (TFT) or a Field Effect Transistor (FET) transistor.

Example 11 is the antenna of example 1 that may optionally include that the voltage storage structure comprises a capacitor.

Example 12 is the antenna of example 1 that may optionally include that the circuitry is operable to reduce a voltage drop on the antenna element due to leakage current of the tunable element.

Example 13 is an antenna comprising: a plurality of radio-frequency (RF) radiating antenna elements, wherein each antenna element of the plurality of RF radiating antenna elements comprises a varactor, circuitry connected to the tuning element to set a voltage on the tunable element, the circuitry comprising a capacitor, a first transistor having a first gate connected to the voltage storage structure, a first source connected to the tunable element, and a first drain for coupling to a constant voltage source, a data voltage input terminal operable to apply a voltage to the voltage storage structure and to the first gate to determine current through the first transistor.

Example 14 is the antenna of example 13 that may optionally include a matrix drive coupled to the circuitry, wherein the circuitry further comprises a second transistor having a second gate coupled to an enable input controlled by the matrix drive, a second drain coupled to the data voltage input terminal, and a second source coupled to the first gate of the first transistor and the voltage storage structure, and further wherein the first transistor acts as a constant current source for tunable element and the tunable element operates as a current-controlled tunable element when data voltage is applied to the first gate.

Example 15 is the antenna of example 13 that may optionally include a matrix drive coupled to the circuitry, wherein the circuitry further comprises a second transistor having a second gate coupled to an enable input controlled by the matrix drive, a second drain coupled to the data voltage input terminal, and a second source coupled to the first gate of the first transistor and the voltage storage structure, and further wherein the circuitry further comprises a resistor coupled to the first source and coupled in parallel with the tunable element, wherein the tunable element operates as a voltage-controlled tunable element when data voltage is applied to the first gate.

Example 16 is the antenna of example 13 that may optionally include that a matrix drive coupled to the circuitry, wherein the circuitry further comprises a second transistor having a second gate coupled to an enable input controlled by the matrix drive, a second drain coupled to the data voltage input terminal, and a second source coupled to the first gate of the first transistor and the voltage storage structure, and further wherein the circuitry further comprises a capacitor load coupled in parallel with the tunable element, wherein the tunable element operates as a voltage-controlled tunable element when data voltage is applied to the first gate.

Example 17 is an antenna comprising: a plurality of radio-frequency (RF) radiating antenna elements, wherein each antenna element of the plurality of RF radiating antenna elements comprises a tunable element, circuitry connected to the tuning element to set a voltage on the tunable element, the circuitry comprising a voltage storage structure, a voltage follower connected in series with the tunable element, the voltage follower and tunable element coupled in parallel to the voltage storage structure, a first transistor having a first gate connected to an enable input, a first source connected to the voltage storage structure and the voltage follower, and a first drain for coupling to a data voltage input terminal operable to apply a voltage to the voltage storage structure and to the first gate to determine current through the first transistor.

Example 18 is the antenna of example 17 that may optionally include that the tunable element comprises a varactor or a MEMS capacitor.

Example 19 is the antenna of example 17 that may optionally include that the first transistor comprises a thin film transistor (TFT) or a Field Effect Transistor (FET) transistor.

Example 20 is the antenna of example 18 that may optionally include that the voltage storage structure comprises a capacitor.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

We claim:

1. An antenna comprising:
- a plurality of radio-frequency (RF) radiating antenna elements, wherein each antenna element of the plurality of RF radiating antenna elements comprises
  - a tunable element subject to voltage degradation over time between write cycles in which drive voltages are written to tunable elements of the plurality of RF radiating antenna elements,
  - circuitry connected to the tuning element to set a voltage on the tunable element, the circuitry comprising
    - a voltage storage structure,
    - a first transistor having a first gate connected to the voltage storage structure, a first source connected to the tunable element, and a first drain for coupling to a constant voltage source to provide a drain-to-source voltage to the tunable element and create a leakage current path through the tunable element, the first transistor operable to decouple the voltage storage structure from the leakage current path to prevent the voltage degradation, and
    - a data voltage input terminal operable to apply a voltage to the voltage storage structure and to the first gate to determine current through the first transistor as a current source for the tunable element.

2. The antenna of claim 1 wherein the tunable element comprises a varactor or a MEMS capacitor.

3. The antenna of claim 1 further comprising a matrix drive coupled to the circuitry, and wherein the circuitry further comprises a second transistor having a second gate coupled to an enable input controlled by the matrix drive, a second drain coupled to the data voltage input terminal, and a second source coupled to the first gate of the first transistor and the voltage storage structure.

4. The antenna of claim 1 wherein the first transistor acts as a constant current source for the tunable element and the tunable element operates as a current-controlled tunable element when data voltage is applied to the first gate.

5. The antenna of claim 1 wherein the circuitry further comprises a resistor coupled to the first source and coupled in parallel with the tunable element, wherein the tunable element operates as a voltage-controlled tunable element when data voltage is applied to the first gate.

6. The antenna of claim 1 wherein the circuitry further comprises a capacitor load coupled in parallel with the tunable element, wherein the tunable element operates as a voltage-controlled tunable element when data voltage is applied to the first gate.

7. The antenna of claim 1 wherein the circuitry further comprises reset circuitry to add a reset period during which the data voltage is applied to the first gate but no current flows through the first transistor.

8. The antenna of claim 1 further comprising a compensation unit external to the circuitry and operable to adjust the data voltage to be applied to the first gate in order to compensate for non-uniformity in a threshold voltage of the first transistor with respect to other of the antenna elements.

9. The antenna of claim 1 wherein the circuitry further comprises auto calibration circuitry coupled to a threshold voltage of the first gate in order to compensate for non-uniformity in the threshold voltage of the first transistor with respect to other of the antenna elements.

10. The antenna of claim 1 wherein the first transistor comprises a thin film transistor (TFT) or a Field Effect Transistor (FET) transistor.

11. The antenna of claim 1 wherein the voltage storage structure comprises a capacitor.

12. The antenna of claim 1 wherein the circuitry is operable to reduce a voltage drop on the antenna element due to leakage current of the tunable element.

13. An antenna comprising:
- a plurality of radio-frequency (RF) radiating antenna elements, wherein each antenna element of the plurality of RF radiating antenna elements comprises
  - a tunable element subject to voltage degradation over time between write cycles in which drive voltages are written to tunable elements of the plurality of RF radiating antenna elements, wherein the tunable element comprises a varactor or a MEMS capacitor,
  - circuitry connected to the tuning element to set a voltage on the tunable element, the circuitry comprising
    - a voltage storage structure,
    - a first transistor having a first gate connected to the voltage storage structure, a first source connected to the tunable element, and a first drain for coupling to a constant voltage source to provide a drain-to-source voltage to the tunable element and create a leakage current path through the tunable element, the first transistor operable to decouple the voltage storage structure from the leakage current path to prevent the voltage degradation,
    - a resistor coupled to the first source and ground and coupled in parallel with the tunable element, and
    - a data voltage input terminal operable to apply a voltage to the voltage storage structure and to the first gate to determine current through the first transistor as a current source for the leakage current through the tunable element.

14. The antenna of claim 13 wherein the circuitry further comprises reset circuitry to add a reset period during which the data voltage is applied to the first gate but no current flows through the first transistor.

15. The antenna of claim 13 further comprising a compensation unit external to the circuitry and operable to adjust the data voltage to be applied to the first gate in order to compensate for non-uniformity in a threshold voltage of the first transistor with respect to other of the antenna elements.

16. The antenna of claim 13 wherein the circuitry further comprises auto calibration circuitry coupled to a threshold voltage of the first gate in order to compensate for non-uniformity in the threshold voltage of the first transistor with respect to other of the antenna elements.

17. An antenna comprising:
- a plurality of radio-frequency (RF) radiating antenna elements, wherein each antenna element of the plurality of RF radiating antenna elements comprises
  - a tunable element subject to voltage degradation over time between write cycles in which a pattern of drive voltages is written to tunable elements of the plurality of RF radiating antenna elements, wherein the tunable element comprises a varactor or a MEMS capacitor,
  - circuitry connected to the tuning element to set a voltage on the tunable element, the circuitry comprising
    - a voltage storage structure,
    - a first transistor having a first gate connected to the voltage storage structure, a first source connected to the tunable element, and a first drain for coupling to a non- constant voltage source to provide a drain-to-source voltage to the tunable element and create a leakage current path through the tunable element, the first transistor operable to decouple the voltage storage structure from the leakage current path to prevent the voltage degradation,
    - a capacitor load coupled to the first source and ground and coupled in parallel with the tunable element, wherein the capacitor load is charged by the non-constant voltage source, holds charge in between the write cycles in which the pattern of drive voltages is written, and discharges during each of the write cycles, and
    - a data voltage input terminal operable to apply a voltage to the voltage storage structure and to the first gate to determine current through the first transistor as a current source for the tunable element.

18. The antenna of claim 17 wherein the circuitry further comprises reset circuitry to add a reset period during which the data voltage is applied to the first gate but no current flows through the first transistor.

19. The antenna of claim 17 further comprising a compensation unit external to the circuitry and operable to adjust the data voltage to be applied to the first gate in order to compensate for non-uniformity in a threshold voltage of the first transistor with respect to other of the antenna elements.

20. The antenna of claim 17 wherein the circuitry further comprises auto calibration circuitry coupled to a threshold voltage of the first gate in order to compensate for non-uniformity in the threshold voltage of the first transistor with respect to other of the antenna elements.

* * * * *